Patented Oct. 10, 1939

2,175,168

UNITED STATES PATENT OFFICE

2,175,168

CHROMABLE DYESTUFFS OF THE TRIARYLMETHANE SERIES

Wilhelm Eckert and Karl Schilling, Frankfort-on-the-Main-Hochst, Germany, assignors to General Aniline Works, Inc., New York, N. Y., a corporation of Delaware No Drawing. Application March 22, 1938, Serial No. 197,372. In Germany March 25, 1937

4 Claims. (Cl. 260—335)

The present invention relates to chromable dyestuffs of the triarylmethane series.

We have found that very fast dyestuffs of the triarylmethane series capable of being chromed are obtained by condensing a benzoyl-benzoic acid, obtainable by condensation of 1 molecular proportion of a hydroxytrimellitic acid or its anhydride with 1 mol of an N-substituted meta-aminophenol and which may have, for instance, the following formula:

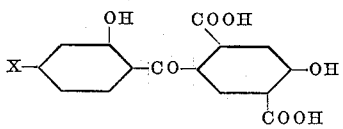

wherein X represents a substituted amino group, such as for instance —N(alkyl)$_2$, NH alkyl or NH aryl, with a meta-dihydroxy-compound having a reactive hydrogen atom of a sulfonic acid group in para-position to the hydroxy group, for instance, by heating the components at a temperature of between about 60° C. and 140° C. in the presence of sulfuric acid. If desired, the dyestuffs thus obtained may be halogenated.

As meta-dihydroxy-compounds there may be used, for instance, resorcinol, chloro- or bromo-resorcinol, resorcinol-mono-methyl ether, 1,3-dihydroxy-naphthalene, phloroglucinol or the like. Hydroxy-trimellitic acids suitable for being used in the present invention are: the 5-hydroxy- and the 3-hydroxy-benzene-1,2,4-tricarboxylic acids.

The new dyestuffs thus obtained dye animal fibers in an acid bath yellowish and bluish red and brown tints and have, when after-chromed, very good properties of fastness. They are, furthermore, appropriate for chrome printing on cotton, artificial silk or the like; they have then clear shades and very good properties of fastness.

The dyestuffs may also be chromed in substance and may then be used for dyeing in an acid solution.

The following examples serve to illustrate the invention, but they are not intended to limit it thereto; the parts are by weight:

1. 38 parts of (4'-diethylamino-2'-hydroxy)-1-benzoyl-ortho-hydroxy-carboxy-2-benzoic acid (obtainable by condensation of diethylamino-meta-phenol and 5-hydroxy-trimellitic anhydride at 125° C. to 130° C.; it is a colorless substance melting at 160° C. to 170° C., while assuming an intense violet-red coloration) are dissolved in 200 parts of sulfuric acid of 75 to 80 per cent. strength. The solution is heated to 90° C. and 14 parts of pyrogallol are added thereto, the pyrogallol dissolving in the solution. After heating, for 4 to 5 hours, at 100° C., the condensation is complete. The whole is poured into 500 parts of water, the Bordeaux dyestuff which has separated is filtered with suction and recrystallized from about 5000 parts of dilute hydrochloric acid. The dyestuff has probably one of the following constitutions:

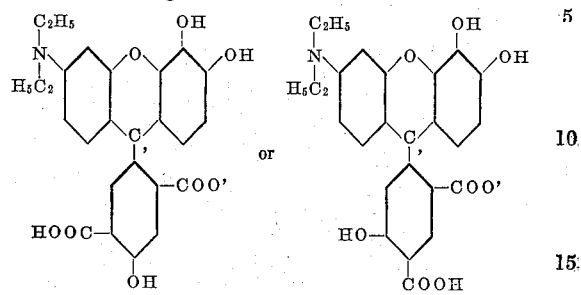

or it is a mixture of substances having the above constitutions. It dyes in an acid bath red tints, becomes violet brown when after-chromed and has very good properties of fastness.

2. When using, instead of the (4'-diethylamino-2'- hydroxy) - 1 - benzoyl-ortho-hydroxy-carboxy-2-benzoic acid used in Example 1 an equivalent proportion of the corresponding dimethyl-amino-compound and proceeding as indicated in Example 1, a dyestuff having the same properties of fastness is obtained.

3. 72 parts of (4'-diethylamino-2'-hydroxy)-1-benzoyl-ortho-hydroxy-carboxy-2-benzoic acid (or 79 parts of its hydrochloride) and 31 parts of 2-nitroresorcinol are heated together for 7 hours in about 500 parts of sulfuric acid of 60° Bé. at 100° C. to 110° C. After cooling the whole is poured into 1500 parts of water. The red precipitate is filtered with suction and wetted several times with water in order to remove the free mineral acid. Then it is dissolved in a dilute sodium carbonate solution and reprecipitated by means of a dilute acid from the solution which has, if necessary, been filtered.

The dyestuff may be recrystallized from alcohol of 50 per cent. strength. It has the following probable constitution:

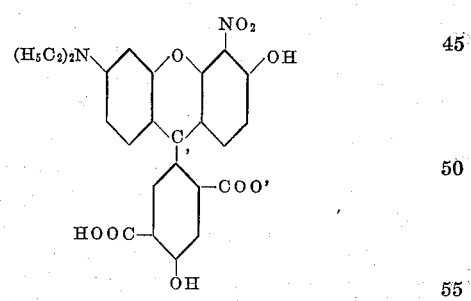

or an isomeric constitution corresponding to the indications given in Example 1. The dyestuff dyes wool in an acid bath a brownish red the fastness of which is considerably enhanced by after-chroming.

4. 35 parts of (4'-dimethylamino-2'-hydroxy)-1-benzoyl-ortho-hydroxy-carboxy-2-benzoic acid (or 38 parts of its hydrochloride) and 15 parts of 4-chloro-resorcinol are dissolved together in 200 parts of concentrated sulfuric acid of 96 per cent. strength. The solution is heated at 60° C. to 70° C. until the formation of the dyestuff is completed, that is for about 4 hours. The dyestuff is isolated by pouring the solution obtained into about 1000 parts of water and filtering with suction the precipitate which separates. After repeated washing with cold water, the dyestuff is dissolved in dilute sodium carbonate solution and reprecipitated from the filtered solution by means of dilute mineral acids or acetic acid. For further purification the red dyestuff may be recrystallized from alcohol of about 50 per cent. strength with addition of a small amount of dilute hydrochloric acid. The dyestuff has the following probable constitution:

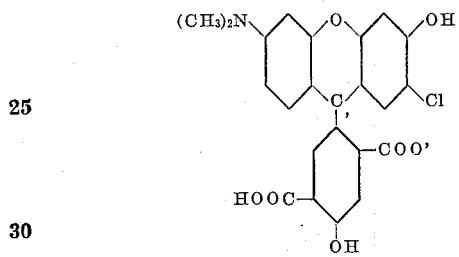

or an isomeric constitution corresponding to the indications in Example 1. It dyes wool in an acid bath clear yellowish red tints which, when after-chromed, become considerably faster without essential change of shade.

5. 42 parts of 4'-(ortho-xylidino)-2'-hydroxy-1-benzoyl-ortho-hydroxy-carboxy-2-benzoic acid of the formula:

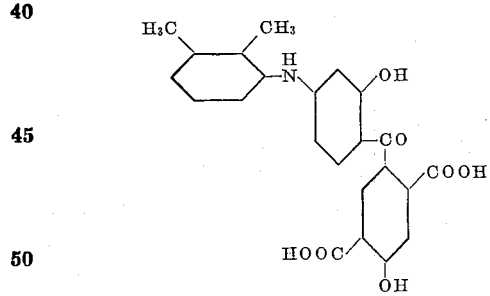

or

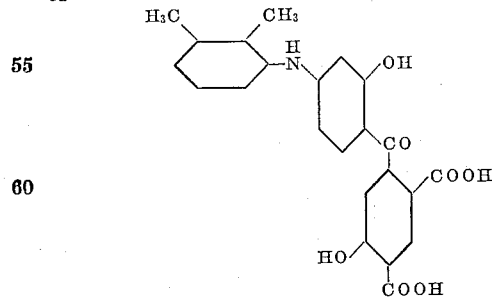

(or 46 parts of its hydrochloride) and 14 parts of pyrogallol are heated together at 110° C. to 120° C. for 5 hours in 360 parts of sulfuric acid of 60° Bé. After cooling, the whole is poured into 1000 parts of water and the red precipitate is filtered with suction. After repeated washing with water the product is dissolved in a dilute sodium carbonate solution, the solution is filtered and the dyestuff is isolated therefrom by means of a dilute acid. It may, if necessary, be recrystallized from dilute alcohol with addition of a small amount of dilute hydrochloric acid. The dyestuff dyes wool in an acid bath violet-red tints. By after-chroming, a brown having good properties of fastness is obtained.

6. 41 parts of (4'-diethylamino-2'-hydroxy)-1-benzoyl-ortho-hydroxycarboxy-2-benzoic acid hydrochloride (cf. Example 1) are stirred with 180 parts of concentrated sulfuric acid, while gently warming, until the evolution of hydrochloric acid has ceased and the whole has been dissolved. To this solution 34.5 parts of potassium resorcinol-4.6-disulfonate are added and the whole is heated for 5 hours at 100° C. In order to isolate the dyestuff, the mixture is poured into 500 parts of water and the red precipitate obtained is filtered with suction. In order to purify the dyestuff, it is dissolved in dilute caustic soda solution and reprecipitated with dilute hydrochloric acid. It has probably the constitution:

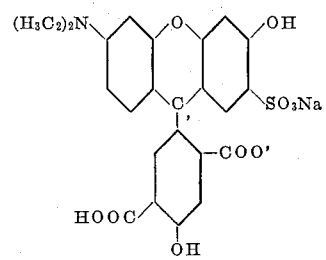

or it is an isomer thereof as illustrated by the formulae given in Example 1. It dyes the animal fiber bright scarlet-red tints which, when after-chromed, are considerably enhanced in their properties of fastness.

We claim:

1. The compounds of the general formula:

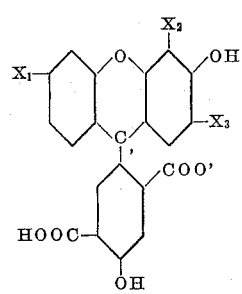

wherein $X_1$ represents a substituted amino group, $X_2$ represents a radical of the group consisting of hydrogen, hydroxy and nitro, $X_3$ represents a radical of the group consisting of hydrogen, chlorine and sulfonic acid.

2. The compound of the formula:

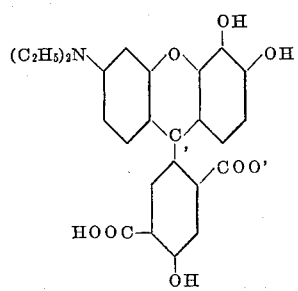

being a dyestuff dyeing in an acid bath red tints, becoming violet brown, when after-chromed, and having very good properties of fastness.

3. The compound of the formula:

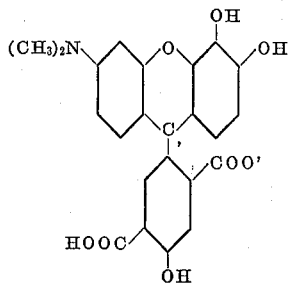

being a dyestuff dyeing in an acid bath red tints, becoming violet brown, when after-chromed, and having very good properties of fastness.

4. The compound of the formula:

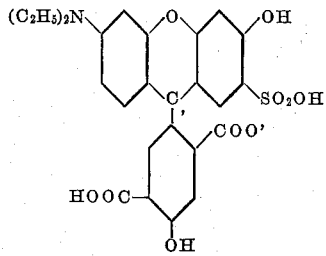

being a dyestuff dyeing the animal fiber bright scarlet-red tints, which, when after-chromed, being considerably enhanced in their properties of fastness.

WILHELM ECKERT.
KARL SCHILLING.